(12) United States Patent
Markovitch

(10) Patent No.: US 6,494,621 B2
(45) Date of Patent: Dec. 17, 2002

(54) BUSHING AND BEARING ASSEMBLY

(76) Inventor: Peter T. Markovitch, 1825 - 30$^{th}$ Avenue N.E., Calgary Alberta (CA)

( * ) Notice: Subject to any disclaimer, the term of this patent is extended or adjusted under 35 U.S.C. 154(b) by 15 days.

(21) Appl. No.: 09/867,576

(22) Filed: May 31, 2001

(65) Prior Publication Data

US 2001/0048780 A1 Dec. 6, 2001

(51) Int. Cl.$^7$ ............................................... F16C 33/10
(52) U.S. Cl. ........................ 384/292; 384/291; 384/378; 384/98
(58) Field of Search ........................... 384/97, 98, 280, 384/283, 291, 292, 378

(56) References Cited

U.S. PATENT DOCUMENTS

| | | | | |
|---|---|---|---|---|
| 1,856,304 A | * | 5/1932 | Whiteley | 384/291 |
| 2,356,027 A | * | 8/1944 | Boyd et al. | 384/97 |
| 2,397,124 A | * | 3/1946 | Buffingtion et al. | 384/292 |
| 2,673,131 A | * | 3/1954 | Kistler | 384/292 |
| 3,971,606 A | * | 7/1976 | Nakano et al. | 384/291 |
| 5,143,455 A | * | 9/1992 | Squyres | 384/97 |
| 5,980,112 A | * | 11/1999 | Matthews | 384/275 |

* cited by examiner

Primary Examiner—Thomas R. Hannon
(74) Attorney, Agent, or Firm—D. Doak Horne; Gowling Lafleur Henderson LLP

(57) ABSTRACT

A Bearing and Bushing assembly where the operational mating surfaces of the bearing and bushing components are each formed with grooves, longitudinally extending the length of each component. The grooves formed in the bushing to be attached to a shaft are spiral, at least two in number, one being a reverse spiral to the other. The bearing assembly has a number of longitudinal, parallel grooves again extending the length of the bearing members. The bearing member is of composite construction. The inner component carrying the grooves being of hard rubber.

4 Claims, 1 Drawing Sheet

BUSHING AND BEARING ASSEMBLY

FIELD OF THE INVENTION

The invention relates to a bearing and bushing assembly for use primarily, but not exclusively in fluid pumping systems.

BACKGROUND

One of the most serious problems associated with pumps and indeed any rotating equipment that comes into contact with a fluid material, is wear in the bearings and/or bushings associated with such equipment. This wear, in general, is caused by abrasive particles suspended in, or forming part of the material being pumped. The higher the percentage of abrasive particles in the material, the shorter the working life of these components.

While considerable attention has been paid to the design of specific application pumps, little or no thought has been given to substantially overcoming the basic problem of wear, other than to utilize materials in the construction of components that are less subject to wear. With the slow decline in conventional oil reserves, attention is now being directed to the recovery of heavy oil, which heretofore has been uneconomic to recover.

As is well known in the oil and gas industry, heavy oil is difficult to pump, not only because of its viscosity, but also because this oil contains a high percentage of sand, sometimes up to 60%. The result therefore is that wells are shut down and major reserves are left in the ground.

With such an abrasive product, a very specific type of pump is required, and indeed, it is only recently that such a pump has been designed, capable of handling heavy oil. This particular pump, which is classified as a "Turbo-Disc" pump is the subject of presently pending Canadian Patent Application Serial #2,185,176, filed Sep. 10, 1996, and is currently assigned to CDM Inc, of Calgary, Alberta, Canada.

The apparatus disclosed in the prior design essentially comprises a cylindrical housing having an intake adjacent to one end to recover the viscous oil and sand mixture and a discharge outlet adjacent to its other end through which the fluid can be pumped. An inner impeller rotationally mounted in the housing generates a "turbo" effect, namely a spiraling, in this case upwardly moving column of fluid which rotates around the housing and thereby induces a flow of the mixture through the intake. A number of rotating discs are arranged in the housing in a separation zone above the intake. These discs are spaced apart from one another and serve to assist in guiding the flow of fluid to the discharge end of the housing. These discs also serve in the separation of the fluid into at least some of its separate components or phases.

Field and bench testing of this pump have shown that its construction does lessen the previously known problem of blade impingement of solids on conventional pumps and hence substantially reduces the blade or disc erosion.

A problem still however exits with regard to components utilized in connecting with this particular pump, in that the bearings and seals, which are subjected to contact with the highly abrasive mixture, are subject to wear.

When this problem becomes evident, the present inventor, whom also invented the "Turbo-Disc" pump, designed the bushing and bearing assembly which is the subject of the present application.

SUMMARY OF THE INVENTION

Accordingly, it is the object of the present invention to substantially reduce the wear in any bearing utilized on contact with abrasive fluids.

It is a further object of the present invention to provide a bearing and bushing assembly that permits abrasive fluid to flow through the assembly in a manner which reduces contact with the metal surfaces.

The present invention therefore comprises a bushing and bearing assembly where the outer surface, a bushing component attached to a rotatable shaft, is provided with a pair of spiral grooves extending the length of the bushing, one groove being in a reverse spiral to the other. The bearing component of the assembly is of composite construction having an outer cylindrical, tubular shell and an inner cylindrical, tubular insert of a material different from that of its outer shell. The surface of the insert which will operationally bear against the grooved surface of the bushing having a parallel, longitudinally extending groove formed therein.

DRAWINGS

Brief Description of the Drawings

The invention will now be describe by way of example only, having the reference to the accompanying drawings, in which.

DETAILED DESCRIPTION OF THE INVENTION

Figure 1:
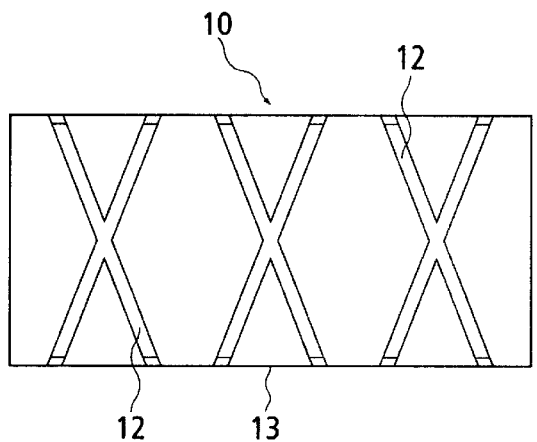
FIG. 1 is a side elevational view of the bushing utilized to separate the bearing from the shaft.
Figure 2:
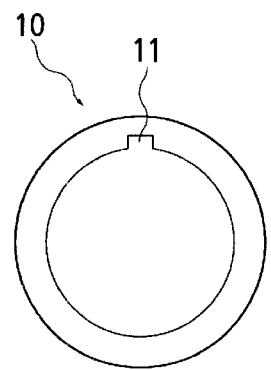
FIG. 2 is an end view of the bushing according to FIG. 1.

Referring now to the drawings, it will be seen that the bushing (10) of FIG. 1 is an elongate tube of wall thickness preferably made of hardened steel. In this particular configuration, bushing (10) is to be attached to a shaft (not shown) by keyway (11) (FIG. 2). The unique feature of the bushing (10) is the double spiral groove (12) in the outer surface (13) of the bushing, one being a right-handed spiral, the other being a left-handed spiral.

The purpose of the double spiral arrangement will be evident from the further description of the inventive assembly.

Figure 3:
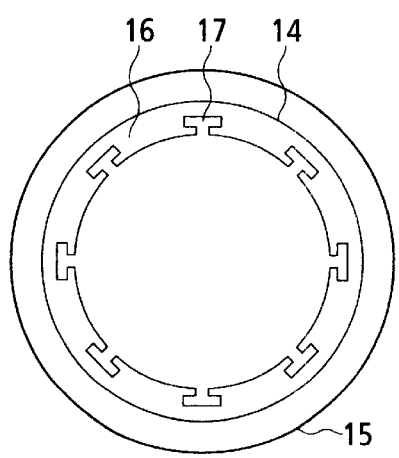
FIG. 3 is a side elevational view of the bearing used in conjunction with the bushing according to FIG. 1.
Figure 4:
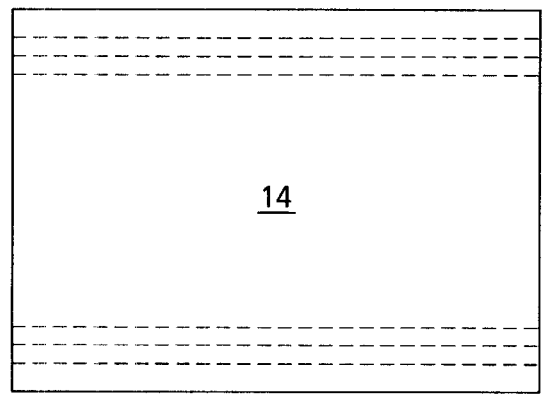
FIG. 4 is an end view of the bearing according to FIG. 3.

Referring now to FIGS. 3 & 4, here is shown the second component of the invention currently, namely the bearing (14). This, as can be seen from FIG. 4, is a composite structure comprising an outer tubular member (15) and an inner tubular member or sleeve (16). The outer member (15) is preferably made of steel, but the inner sleeve (16) is formed of a hard rubber, and fixedly attached to the inner circumference of member (15). As can also be seen from FIG. 4, the inner surface of member (15) is provided with a number of spaced apart grooves (17), in this embodiment T-shaped, which extend radially into sleeve (16) and also as seen from FIG. 3, longitudinally the entire length of the bearing (14), and parallel one with the other.

The components are, as will be evident to one skilled in the art, placed in a working relationship, by sliding the bushing (10) (which will be attached to the shaft) into the bearing (14) (which for example will have been force-filled into a housing wall (now shown)). The outer surface (13) of bushing (10) will be a sliding-fit with the inner surface of sleeve (16).

In general, the components of this assembly are immersed in the viscous and abrasive oil mixture, and the pumping system is activated. Any of the mixture that comes into contact under pressure with the bearing surfaces will be able to pass freely though the bearing via the unique groove arrangement, thus lessening the chance of particles of sand being trapped between the bearing and bushing surfaces to cause wear, as in prior arrangements.

A further and important feature of the subject's inventive assembly is the fact that, by providing two, reverse spiraled grooves (12), permits the drive, or rotation of the drive shaft reversed, without reintroducing a wear factor.

While in the above description, reference is made only to application in heavy oil it is not intended to limit the usefulness of the assembly. It must be clear that the bearing and bushing assembly could be utilized in any rotational system where bearings have to be operated submerged in abrasive liquids or mixtures.

I claim:

1. A bushing and bearing assembly including a first elongate, tubular cylindrical bushing member adapted to be attached to a rotatable shaft, the outer surface of said first member having two spiral grooves formed therein extending the length of said first member, one of said grooves being formed in a spiral in reverse to the other; a second elongate, tubular cylindrical bearing member of composite structure comprising an outer cylindrical tubular component and an inner cylindrical tubular component fixedly attached one to the other, the inner surface of said inner component having formed therein a plurality of parallel circumferentially spaced apart grooves extending radially into said component and longitudinally, the length of said first member; whereby upon insertion of said first bushing member into said second bearing member, the groove carrying surfaces of each respective member are assembled in sliding and bearing relation one with the other.

2. The assembly according to claim 1 wherein said inner cylindrical tubular component of said bearing member is formed from a hard rubber.

3. The assembly according to claim 2 wherein said component is fixedly attached to said outer component by adhesive.

4. The assembly according to claim 1 wherein said grooves in said bearing members are T-shaped in cross section.

\* \* \* \* \*